Patented May 5, 1953

2,637,072

UNITED STATES PATENT OFFICE 2,637,072

MANUFACTURE OF CARBON MOLDED BODIES

Charles Desmond Greaves and William Duncan Parker, London, England, assignors to C. D. Patents Limited, London, England, a British company No Drawing. Application May 27, 1949, Serial No. 95,890. In Great Britain June 2, 1948

5 Claims. (Cl. 18—47.5)

This invention relates to improvements in the manufacture of carbon moulded bodies.

In United States specification No. 2,461,365, processes are described in which a moulded body made from finely divided bituminous coal alone or in conjunction with swell-inhibiting agents is subjected under non-oxidising conditions to a firing operation at a carefully controlled rate of temperature rise to produce strong, tough, undistorted products having no cellular structure visible to the naked eye, and in this specification the expression "the type described" refers to the type of process in which such a carefully selected rate of firing of a coal-containing moulded body is used to produce such products.

The processes described in said earlier specification were limited to the case where the coal used in the starting material had good agglutinating properties (e. g. had a swelling number of 2–10). Again in said earlier processes the material subjected to the moulding was dry (i. e. it consisted of very finely divided coal alone or with a swell-inhibiting agent), and the moulding pressures were generally high. The production of the strong, tough, undistorted products having no cellular structure visible to the naked eye is a very striking phenomenon which to a large extent is contributed to by the rate of firing of the moulded shapes, but there are certain circumstances in which advantages accrue from the use of plastic moulding compositions, i. e. compositions in which the powdered coal before moulding into a desired shape is mixed with a hydrocarbon-containing plasticising agent after which the firing of the type described takes place.

By this method it is possible to make large tiles, bowls and more complex shapes which cannot be so satisfactorily moulded from a dry powder.

The hydrocarbon-containing plasticising agents to be mixed with the powdered coal may be solid and/or liquid i. e. they may be pitches, tars, coal tar distillates (such as anthracene oil, naphtha or benzene) or hydrocarbon-containing volatile solvents singly or mixed. If solid, the plasticising agent is crushed to a particle size convenient for mixing (e. g. ⅛" or less).

This invention comprises a process of the type described for the manufacture of carbon moulded bodies in which process powdered coal is mixed with one or more plasticising agents consisting of or containing hydrocarbons of the kind specified, at an elevated temperature, the mixture is moulded to the desired shape at a temperature at which the mixture will flow, and the moulded shape is fired under non-oxidising conditions at a controlled rate of temperature rise such as to produce strong, tough, undistorted products having no cellular structure visible to the naked eye.

As in the earlier processes above referred to, rapidity of temperature rise during firing tends to promote strength and toughness in the fired product but on the other hand rapidity of temperature rise in that range of temperature within which gases or vapours may be generated in or evolved from the constituents of the moulded composition (while that composition or a part of it is in a soft or semiliquid state) tends to cause intumescence, and it is a feature of this invention that the rate of temperature rise particularly within that temperature range whilst being rapid is nevertheless insufficiently rapid to cause swelling.

Swell-inhibiting agents may also be employed as described in United States specification No. 2,461,365.

Dealing now with the process in detail:

1. The raw materials comprise—
   (a) Carbonaceous coals or coals with 10–15% volatile matter (on a dry ash-free basis).
   (b) Plasticisers. Pitch, tar or coal-tar distillates (such as anthracene oil, naphtha or benzene) and volatile hydrocarbon-containing compounds such as volatile solvents alone or mixed: and, if desired,
   (c) Physical or chemical swell-inhibitors as described in United States specification No. 2,461,365.

2. Comminution—
   (a) Coal should be ground fine, for example 100% to 100 mesh per linear inch and 10%+200 mesh per linear inch or finer if convenient.
   (b) Plasticising agents such as pitch if solid may be crushed to a convenient size for mixing, e. g. so as to pass through a one-eighth inch screen.

3. Mixing is carried out at about 100–150° C. or at that temperature at which the plasticizer is soft, whichever is the higher.

4. Moulding is carried out at about 100° C. or somewhat higher. The pressure used may be relatively low (say about 2 tons per square inch).

5. Drying. It may be desirable to heat the moulded shape prior to firing in an oven at about 60–100° C. for some hours (e. g. over night) in order to remove more volatile components.

6. Firing is carried out under non-oxidising conditions at a rapid rate of temperature rise consistent with the avoidance of intumescence, swelling or cracking.

The pressing of the plastic composition may be automatic and a relatively low moulding pressure may be employed, so that the production of large moulded products (such as large tiles), is possible with smaller pressures than in the dry powder process described in the prior specification above referred to.

Pressing rejects may be remixed and pressed again.

*Example*

| | Per cent |
|---|---|
| S. Wales carbonaceous coal having 14% volatile matter ground so that 90% passed through a 200 mesh sieve | 80 |
| Coal tar pitch (softening 105° C.—one-eighth inch mesh) | 14 |
| Naphthalene oil (B. P. 255–290° C.) | 6 |

These were mixed in a gas-heated, Z-blade mixer for 2 hours at 120–130° C. and then for the same time at 70–75° C. to disintegrate any lumps. Bars were then moulded from the mix at a pressure of 2 tons per square inch in a mould at 100° C.

The moulded shapes were buried in ground coke in a steel box fitted with a lid and fired in a non-oxidising atmosphere at a rate of temperature rise of ½° C. per minute to 600° C. and then at a rate of temperature rise of 2° C. per minute to 1200° C., the latter temperature being maintained for 30 minutes. On cooling under non-oxidising conditions hard, strong, tough, undistorted products were obtained with the following characteristics:

| | |
|---|---|
| Loss of weight | 22.5 per cent |
| Linear contraction | 15.0 per cent |
| Apparent density | 1.64 gm./cc. |
| Porosity (to water) | 8.4 per cent |
| Modulus of rupture | 8,200 lb./sq. in. |

As mentioned above the mixture which is moulded may contain a swell-inhibiting agent of a diluent character such as a weakly-coking coal or a non-coking coal or pitch coke or coke breeze or graphite.

The determination of the rate of firing of the moulded articles is a matter of importance in the present invention. When the nature and proportions of the constituents of the mixture have been selected it is convenient to produce test-pieces from said mixture and to fire the test-pieces in a non-oxidising atmosphere to a temperature of at least 550° C. and to control the rate of firing in such manner as to produce a fired test-piece free from cracks and free from a cellular structure visible to the naked eye. Thereafter the moulded article according to this invention is fired under the conditions and at the rate at which the last-named test-piece was fired to produce an article having the properties of the last-named fired test-piece, and generally the moulded article thus fired is further fired to a temperature between 650° C. and 1200° C. to produce an article having freedom from cracks and cellular structure in like degree as said last-named fired test-piece, after which the fired article is cooled in a non-oxidising atmosphere.

We claim:
1. The process for the manufacture of carbon moulded bodies in which process powdered coal containing from 10 to 15 per cent of volatile matter on a dry ash-free basis is intimately mixed and agitated at a temperature between 100° C. and 150° C. with a hydrocarbon-containing plasticizing agent which is plastic at that temperature, the proportions by weight being about 4 parts of coal to 1 part of plasticizing agent, the resulting mixture in a plastic condition is moulded to the desired shape at about the same temperature and under a pressure of the order of two tons per square inch and the moulded shape is then fired under non-oxidising conditions at a rate of temperature rise such as to produce an undistorted product free from cracks and having no cellular structure visible to the naked eye, the fired product being allowed to cool in a non-oxidising atmosphere.

2. The process for the manufacture of carbon moulded bodies in which process powdered coal containing from 10 to 15 per cent of volatile matter on a dry ash-free basis is intimately mixed and agitated for at least two hours at a temperature between 100° C. and 150° C. with a hydrocarbon-containing plasticizing agent which is plastic at that temperature, the proportions by weight being about 4 parts of coal to 1 part of plasticizing agent, the resulting mixture in a plastic condition is moulded to the desired shape at about the same temperature and under a pressure of the order of two tons per square inch and the moulded shape is then fired under non-oxidising conditions at a low rate of temperature rise of about ½° C. per minute up to about 600° C. then at a higher rate of about 2° C. per minute up to about 1200° C., the fired product being allowed to cool in a non-oxidising atmosphere.

3. The process as claimed in claim 2 in which the coal is of a size which passes a sieve of 100 meshes to the linear inch.

4. The process as claimed in claim 2 in which the moulded shape, prior to firing, is dried at a temperature between 60° C. and 100° C. for some hours.

5. The process for the manufacture of carbon moulded bodies in which process powdered coal of which 90 per cent passes a sieve of 200 meshes to the linear inch and which contains from 10 to 15 per cent of volatile matter on a dry ash-free basis is intimately mixed and agitated for at least two hours at a temperature between 100° C. and 150° C. with coal tar pitch ground to a particle size of about one-eighth of an inch and softening at a temperature of about 100° C. and with a hydrocarbon oil in the proportions, coal about 80 per cent, pitch about 14 per cent and hydrocarbon oil about 6 per cent, the resulting plastic mixture is moulded to the desired shape at about 100° C. and under a pressure of about 2 tons per square inch and the moulded shape is then buried in ground coke and fired in a non-oxidising atmosphere first at a rate of temperature rise of ½° C. per minute to 600° C. and then at a rate of temperature rise of 2° C. per minute to 1200° C., the latter temperature being maintained for about 30 minutes before allowing the fired product to cool in a non-oxidising atmosphere.

CHARLES DESMOND GREAVES.
WILLIAM DUNCAN PARKER.

References Cited in the file of this patent
UNITED STATES PATENTS

| Number | Name | Date |
|---|---|---|
| 2,304,773 | Anderton | Dec. 15, 1942 |
| 2,404,208 | Bangham et al. | July 16, 1946 |
| 2,461,365 | Bennett et al. | Feb. 8, 1949 |
| 2,466,435 | Jones et al. | Apr. 5, 1949 |